(12) United States Patent
Baidya et al.

(10) Patent No.: US 11,176,658 B2
(45) Date of Patent: Nov. 16, 2021

(54) ITERATIVE SUPERVISED IDENTIFICATION OF NON-DOMINANT CLUSTERS

(71) Applicant: Intel Corporation, Santa Clara, CA (US)

(72) Inventors: Bikram Baidya, Portland, OR (US); Allan Gu, Portland, OR (US); Vivek K. Singh, Portland, OR (US); Kumara Sastry, Hillsboro, OR (US); Abde Ali Hunaid Kagalwalla, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 62 days.

(21) Appl. No.: 16/572,446

(22) Filed: Sep. 16, 2019

(65) Prior Publication Data
US 2020/0013161 A1 Jan. 9, 2020

(51) Int. Cl.
*G06T 7/00* (2017.01)
*G06K 9/62* (2006.01)

(52) U.S. Cl.
CPC .......... *G06T 7/0004* (2013.01); *G06K 9/6218* (2013.01); *G06K 9/6267* (2013.01); *G06T 2207/10056* (2013.01)

(58) Field of Classification Search
None
See application file for complete search history.

(56) References Cited

U.S. PATENT DOCUMENTS 8,477,109 B1 * 7/2013 Freed .................. G06F 3/04842
345/173
2016/0189055 A1 * 6/2016 Zvitia .................... G06N 20/00
706/11

OTHER PUBLICATIONS

Ester, Martin, et al., "A Density-Based Algorithm for Discovering Clusters in Large Spatial Databases with Noise", Proceedings of the Second International Conference on Knowledge Discovery and Data Mining, Portland, Oregon, Aug. 1996, pp. 226-231.

* cited by examiner

*Primary Examiner* — Leon Flores
(74) *Attorney, Agent, or Firm* — Alliance IP, LLC

(57) ABSTRACT

A method comprising determining a binary classification value for each of a plurality of data instances based on a first threshold value assigned to each of the plurality of data instances; applying at least one clustering model to a first subset of the plurality of data instances to identify one or more dominant clusters of data instances; determining a second threshold value to assign to a second plurality of data instances that are included within the one or more dominant clusters of data instances; and redetermining a binary classification value for each of the plurality of data instances based on the second threshold value assigned to the second plurality of data instances and the first threshold value, wherein the first threshold value is assigned to at least a portion of data instances of the plurality of data instances that are not included in the second plurality of data instances.

20 Claims, 9 Drawing Sheets

ITERATIVE SUPERVISED IDENTIFICATION OF NON-DOMINANT CLUSTERS

TECHNICAL FIELD

This disclosure relates in general to the field of computing systems and, more particularly, to iterative supervised identification of non-dominant clusters.

BACKGROUND

Cutting-edge semiconductor manufacturing processes are terribly complex. Housed in billion-dollar factories and comprising hundreds of processing steps to yield a finished device, they are capable of reliably printing features as small as 10 nm hundreds of billions of times across wafers that extend a foot in diameter. Developing a new semiconductor manufacturing process requires defining a set of design rules that establish constraints that a semiconductor device must follow to ensure manufacturability. Process development also involves developing optical proximity correction (OPC) recipes that adjust physical design features before they are printed on a mask to help counter feature distortions caused by various processing steps.

Images taken during wafer manufacturing can help identify physical design patterns and geometries that may explain manufacturing defects. These patterns and geometries can be used to help define the design rules and OPC recipes for a process. The manufacture of a single wafer can generate a large amount of image data given the large wafer size and number of processing steps in modern processes. As a process matures, manufacturing defects occur less frequently, making them hard to find in a vast sea of image data.

BRIEF DESCRIPTION OF THE DRAWINGS

Like reference numbers and designations in the various drawings indicate like elements.

DESCRIPTION OF EXAMPLE EMBODIMENTS

Figure 1A:
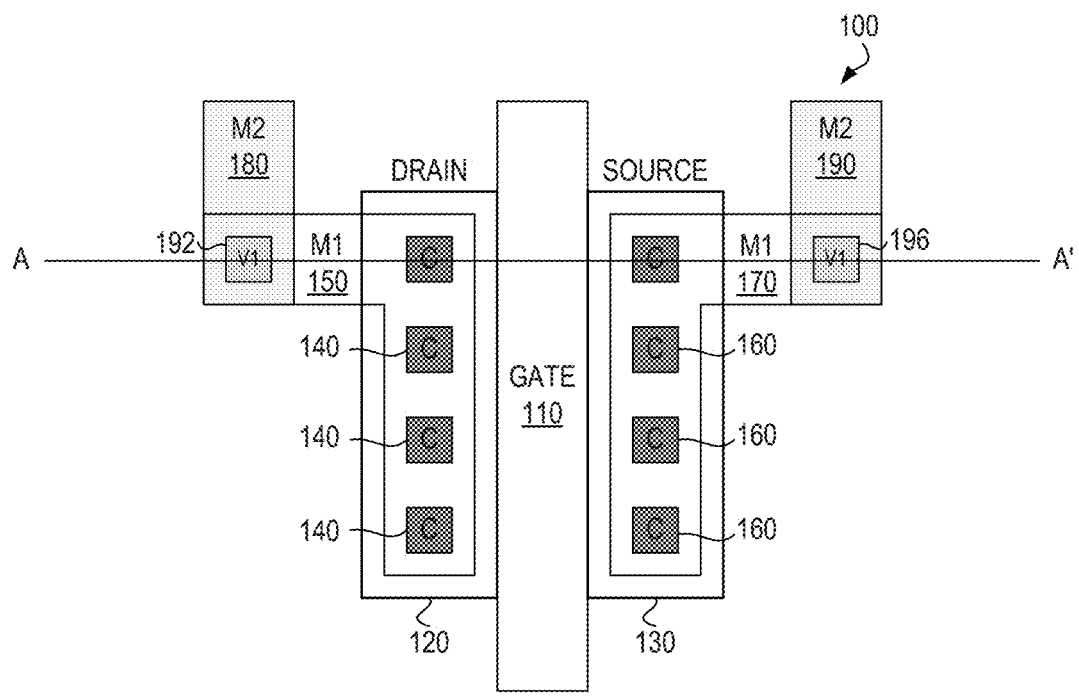
FIG. 1A illustrates the physical design of an exemplary planar transistor in accordance with certain embodiments.

Semiconductor manufacturing has become increasingly complex over the years. Since the turn of the century, the minimum feature size has shrunk by over an order of magnitude as the industry has progressed from the 130 nanometer (nm) to 10 nm technology nodes. At the same time, processor complexity has dramatically increased. Current flagship products have transistor counts that well exceed 10 billion. To handle these reduced feature sizes and increased chip complexities, companies must invest billions of dollars and years of research to build state-of-the-art fabrication facilities. Research and development costs are driven ever-upward by the rising cost of increasingly sophisticated equipment needed for advanced processes. The industry has taken steps to decrease per-transistor manufacturing costs (for example, by moving from 200 mm to 300 mm wafers at the 90 nm technology node), but the overall trend has been for each process generation to cost more than the last. With up to hundreds of individual dies on wafers that span a foot in diameter, the total number of transistors that can be printed on a wafer is on the order of one trillion. Developing high-volume manufacturing processes that can reliably manufacture transistors at such an extreme scale presents considerable challenges.

One such challenge is discovering the patterns and geometries in a physical design responsible for limiting process yield. Manufacturing defects can be discovered through analysis of images generated by an imaging tool during wafer manufacturing, but the amount of image data that is to be analyzed to locate defects can be tremendous (up to millions of images). As a process matures, the presence of a manufacturing defect in the mountain of image data that can be generated may be a rare event. Once defects are located, determining whether a particular physical design pattern or geometry is responsible for a class of defects is another difficult task, particularly considering the amount of data that to be analyzed.

The technologies described herein extract semantic patterns from large amounts of silicon data to aid in semiconductor manufacturing process development. Large numbers of images are analyzed for the presence of manufacturing defects in areas of interest on a wafer. A continuous itemset is generated with items containing the values of physical design features corresponding to the areas of interest and an event value indicating the presence or absence of a manufacturing defect at that location. Entropy-based discretization is performed on the discretized itemset to generate a set of candidate semantic patterns. As used herein, the phrase "semantic pattern" refers to one of more sentences or phrases describing constraints on one or more physical design feature values. A semantic pattern can describe a single value for a feature, "gate length=20 nm," a range of values for a feature, "gate endcap space≤18 nm," and constraints for multiple features, "gate length=20 nm, gate endcap space≤18 nm."

The set of candidate semantic features is reduced to a set of final semantic features that are ranked and presented to a user, such as a process engineer. The semantic features can be ranked based on their accuracy, coverage, interpretability, and independence. Generally, top-ranked semantic patterns are generally those that do a good job of explaining manufacturing defects (the patterns are accurate and provide good defect coverage, as will be discussed in greater detail below) and are simple for a user to understand. The user can use extracted semantic patterns to improve a process by updating the design rule set for a process, improving an optical proximity correction (OPC) recipe, or in other manners.

Reference is now made to the drawings, wherein similar or same numbers may be used to designate same or similar parts in different figures. The use of similar or same numbers in different figures does not mean all figures including similar or same numbers constitute a single or same embodiment.

Turning now to FIGS. 1-3, an overview of various aspects of semiconductor device manufacturing is presented. FIG. 1A illustrates the physical design of an exemplary planar transistor. As will be discussed in greater detail below, the physical design of a transistor is used to generate the masks that will be used during manufacturing to print the features on a wafer needed to implement a particular design. The physical design is typically a set of polygons drawn at various layers, such as a gate layer, contact layer, and metal-1 layer.

Transistor 100 is a field-effect-transistor (FET), the transistor type that comprises the bulk of transistors used in modern semiconductor devices. Transistor 100 comprises gate 110, drain 120, and source 130 regions. The gate region in a FET can be thought of as an "on-off" switch that controls the flow of current between drain and source regions. When gate 110 is "off", there is no (or little) current flowing through a channel region that connects drain 120 to source 130 and when gate 110 is "on", current readily flows through the channel region. Transistor 100 is connected to other transistors by a set of interconnect layers stacked vertically on top of transistor 100. Contacts 140 connect drain 120 to segment 150 of a first metal layer (M1), and contacts 160 connect source 130 to M1 segment 170. M1 segments 150 and 170 are in turn connected to a second metal layer (M2) segments 180 and 190 by a first layer of "vias" (V1) 192 and 196, respectively. In general, metal layer thickness increases as one moves up the interconnect stack, with thinner lower-level metals being generally used for the local routing of signals and thicker upper-level metals being used for global signal routing and power/ground planes. For simplicity, FIG. 1A shows only two levels of metal. Current semiconductor manufacturing processing have up to ten layers of metal interconnects.

Figure 1B:
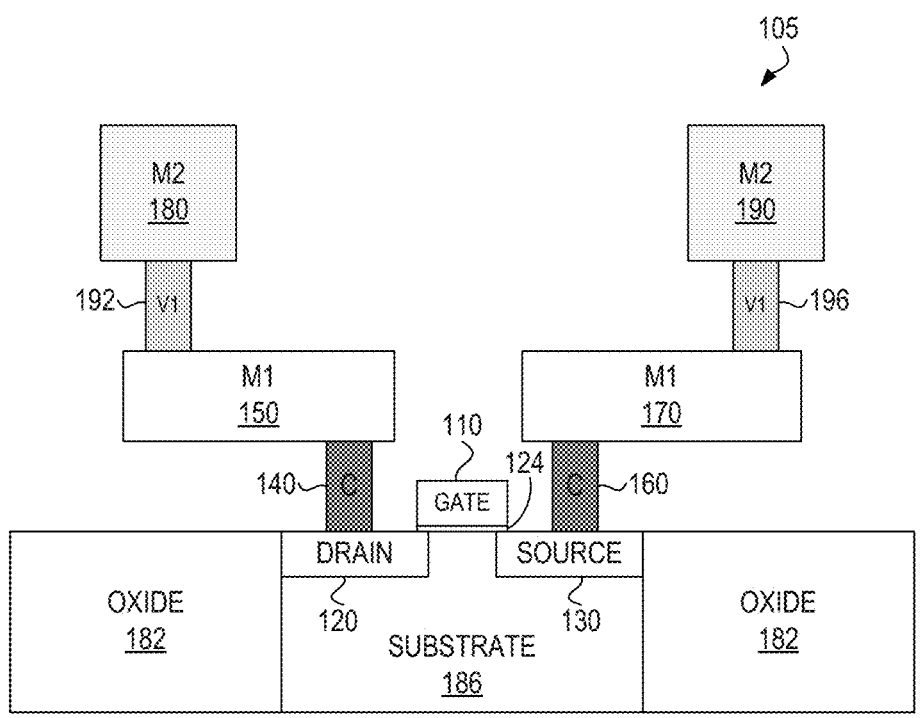
FIG. 1B illustrates an exemplary cross-section of the planar transistor of FIG. 1A taken along the line A-A' in accordance with certain embodiments.

FIG. 1B illustrates an exemplary cross-section of the planar transistor of FIG. 1A taken along the line A-A'. Cross-section 105 shows gate 110 separated from drain 120 and source 130 regions by high-k dielectric layer 124, which electrically insulates gate 110 from drain 120 and source 130. Transistor 100 is in substrate region 186 and is insulated from adjacent transistors by oxide regions 182. The planar transistor illustrated in FIGS. 1A and 1B is just one type of transistor topography, the planar nature of the transistor reflecting that the gate, source, and drain regions are located on or are adjacent to a relatively planar surface. Another type of transistor topography is the non-planar transistor topography used in FinFETS, which are used extensively in cutting-edge manufacturing processes. Fin-FETS are field-effect transistors that operate under the same general principle as planar FET transistors—a gate controls the flow of current between drain and source region—with the variation that the gate wraps around a set of fins that extend vertically upwards from the wafer surface.

Essential to semiconductor manufacturing is the process of photolithography, by which patterns are transferred from a mask onto a wafer. As previously mentioned, masks are used to define the shape and location of various features to be patterned on a wafer for a given process layer. For example, one mask defines where oxide regions are located, another mask defines where high-k dielectrics will be located, another mask defines location of source and drain regions, and yet another mask will define where contacts will be placed. Additional masks may be used to define each metal layer and intervening via layers.

Figure 2A:
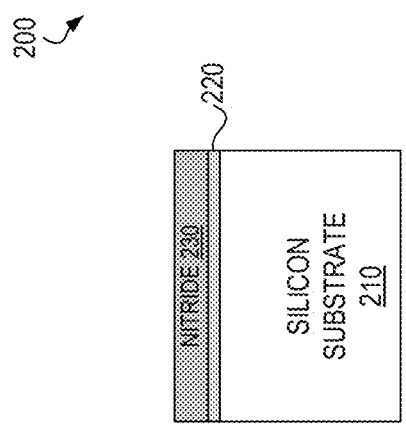
FIGS. 2A-2F illustrate an exemplary photolithography process in accordance with certain embodiments.
Figure 2B:
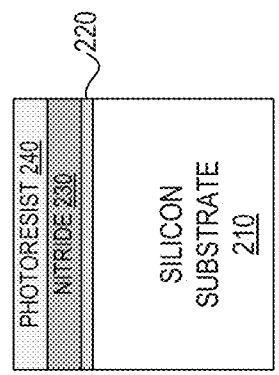
Figure 2C:
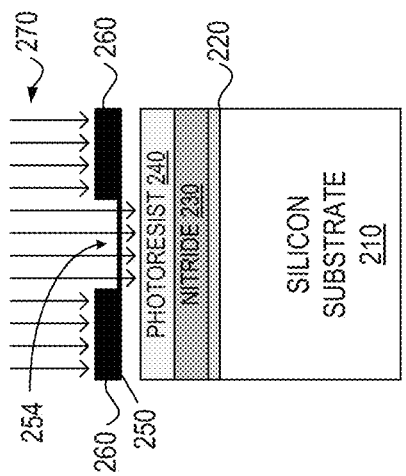
Figure 2D:
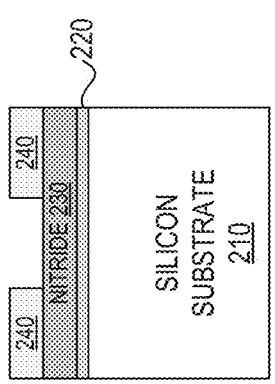
Figure 2E:
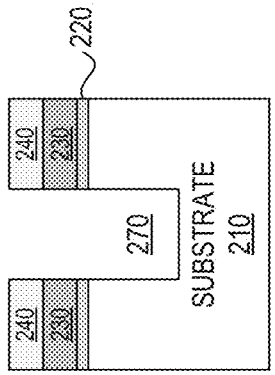
Figure 2F:
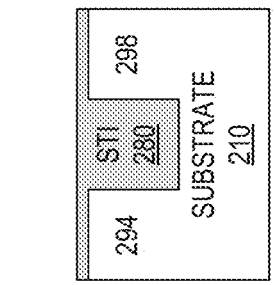

FIGS. 2A-2F illustrate an exemplary photolithography process. Process 200 illustrates how the oxide regions 182 in FIG. 1B can be defined using photolithography. In FIG. 2A, a thin silicon dioxide layer 220 is thermally grown across the top of silicon substrate 210 of a wafer. Silicon nitride layer 230, a protective layer, is deposited on top of silicon dioxide layer 220. In FIG. 2B, photoresist 240 is deposited on top of nitride layer 230. A photoresist is a material whose reactance to an etchant or solvent increases (if a positive photoresist) or decreases (negative photoresist) upon exposure to light. In process 200, photoresist 240 is a positive photoresist. In FIG. 2C, mask 250 with patterns 260 is positioned over the wafer and exposed to light. The light passes through transparent region 254 of mask 250 and exposes photoresist 240. Patterned regions 260 are opaque to the light and the photoresist regions under patterns 260 are not exposed. In FIG. 2D, photoresist 240 is chemically developed and the exposed regions are dissolved. The remaining portions of photoresist 240 can now act as an on-wafer mask to allow for selective processing of the wafer. In FIG. 2E, the wafer is subjected to an etch step that removes a portion of the silicon nitride layer 230, silicon dioxide layer 220, and substrate 210 to create trench 270. In FIG. 2F, the photoresist and nitride layers are removed, and trench 270 is filled with silicon dioxide to create shallow trench isolation (STI) region 280 that serve to keep transistors formed in regions 294 and 298 electrically isolated from each other.

As masks are the means by which features are realized in semiconductor devices, any semiconductor device design must ultimately be reduced to a physical design, the level of design abstraction from which masks are be generated. The physical design of a transistor (such as FIG. 1A), circuit, or processor to be manufactured is often referred to as a "layout." Electronic design automation (EDA) tools allow processor architects and circuit designers to design at levels of abstraction above the physical design level. They are thus spared from having to spend their days drawing polygons in layout tools to realize their designs. Architects typically define their designs using a hardware design language (HDL), such as VHDL or Verilog. Once they have verified that their designs perform as desired, a physical design can be generated automatically using a library of standard layout cells. Circuit designers often seek performance or functionality not available using standard cells and often enter their designs into a schematic capture tool. Once their custom designs are finalized, the circuit schematics are handed off to layout designers who manually craft the custom physical designs.

Regardless of whether a physical design is generated automatically or manually it must conform to a set layout design rules established for a manufacturing process. Design rules are constraints that a physical design must follow to ensure manufacturability. Most design rules express a minimum width or space for a feature, such as, "gate length≥10 nm," "source/drain diffusion enclosure of a contact≥16 nm," and "space between metal-1 traces≥20 nm." Design rules represent a trade-off between feature density and manufacturability. Being able to print smaller feature sizes can mean more die can be packed onto a wafer but if the process cannot reliably print the smaller features, the resulting reduction in wafer yield can more than offset cost reduction gained by being able to print more die on a wafer.

Developing design rules for a new process can be difficult as unexpected difficulties can arise. For example, a feature may not scale as much as expected from the previous technology generation due to unforeseen difficulties with a new processing step or a new tool. As process engineers develop a new manufacturing process, they continually fine-tune the individual processing steps to remove as many defect sources as possible. At some point, the process has been tuned enough that the remaining defects that need to be rooted out occur so infrequently that they are difficult to find. Process engineers need to find the occurrence of these rare events during process development so that they can determine whether a tweak to the process can be figured out to reduce the occurrence of the rare event, or to add a design rule to the design rule set so that physical design geometries and patterns correlated to a specific defect are kept out of the final physical design.

Once a physical design is clear of design rule violations and has passed other design validation checks, it is passed to the mask generation phase of an EDA flow. The mask generation phase is far from trivial due to the large discrepancy between the wavelength of the light ($\lambda=193$ nm) that has been used since the 90 nm technology node and the minimum feature sizes (e.g., 10 nm) used in the current processes. The minimum feature size that can be printed clearly in a photolithographic process is limited by the wavelength of the light source used and the semiconductor industry has developed resolution enhancement technologies (RET) to allow for the printing of features well below the 193 nm light source wavelength. A first set of RET techniques works to increase resolution and/or depth of focus, and a second set compensates for distortion effect due to printing features with a wavelength larger than minimum feature sizes as well as those inherent in deposition, etching, and other process steps. The first set includes techniques such as phase-shift masks and double-patterning, and the second set includes optical proximity correction (OPC).

Figure 3A:
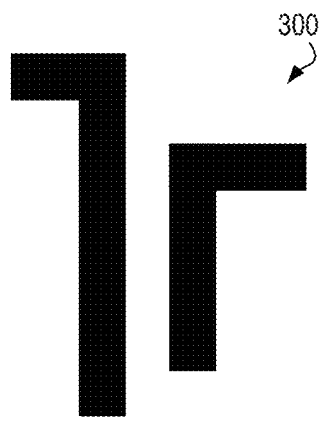
FIGS. 3A-3D illustrate differences between features printed on a mask and those processed on a wafer due to process distortion effects and the use of optical proximity correction to counter those effects in accordance with certain embodiments.
Figure 3B:
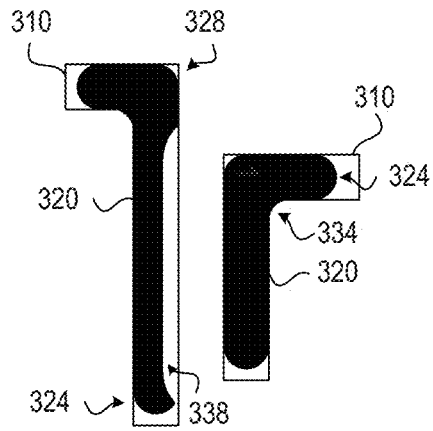
Figure 3C:
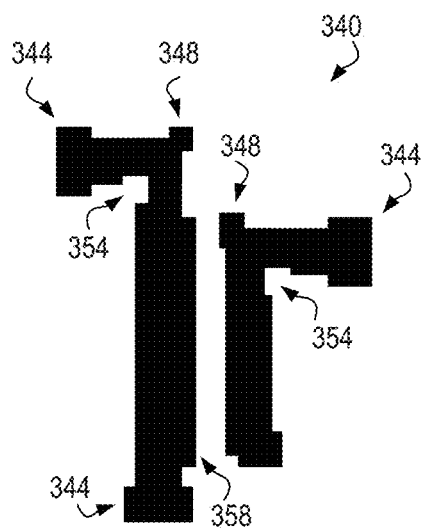
Figure 3D:
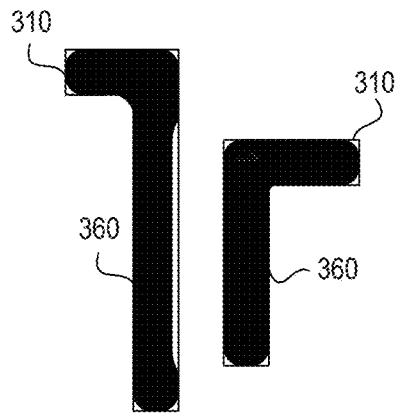

FIGS. 3A-3D illustrate differences between features printed on a mask and those processed on a wafer due to process distortion effects and the use of optical proximity correction to counter those effects. FIG. 3A illustrates two gate polygons 300 in a physical design before being subjected to an OPC process. FIG. 3B illustrates a simplified view of how polygons 300 may appear as processed on a wafer. Outlines 310 represent the boundaries of polygons 300 and shapes 320 represent the corresponding as-processed features. It can be seen that ends 324 and exterior corners 328 of shapes 320 are rounded off, interior corners 334 are filled in, and segment 338 narrowed due to a nearby feature. FIG. 3C illustrates exemplary modified polygons 340 generated by subjecting polygons 300 to an OPC process. Modified polygons 340 are much more complex than original polygons 300. Modified polygons 340 include "dog-bone" features 344 that compensate for end-rounding, "ear" features 348 that compensate for exterior corner-rounding, "mouse-bite" features 354 that compensate for interior corner-rounding, and thickening features 358 that compensate for the presence of nearby features. FIG. 3D illustrates a simplified view of how modified polygons 340 may appear on a wafer after processing. Outlines 310 again represent the boundaries of original polygons 300. As can be seen, modification of polygons 300 by the OPC process results in printed shapes 360 that are closer to the shape and size of original polygons 300. The ends and corners of shapes 360 are less rounded off, the interior corners are less filled in, and the impact of nearby neighbors is diminished.

While OPC generation (and other RET techniques) have allowed minimal features to scale with technology node as the wavelength of the photolithographic light source has remained constant, it does not come without its costs. OPC generation is computationally intensive. OPC recipes can be based on physical models of various processing steps (photolithography, diffusion, etch, deposition, etc.), or be rule-based models that generate OPC features based on individual physical design feature characteristics (width, length, shape, nearest-neighbor characteristics) without relying on the physics of the underlying process steps. The application of model-based OPC recipes to a complete physical design may involve the application of physical models to over 10 billion shapes at the gate layer alone and to billions of additional shapes on other layers. Further, the generation of rule-based OPC models, which may save some of the computational complexity of model-based OPC generation, can be a complex affair. Generation of rule-based OPC recipes can be based on trial-and-error due to a lack of full understanding of the complex physics and chemistries at play in the development of cutting-edge processing technologies. This trial-and-error can comprise iteratively manufacturing features with many variations of candidate OPC recipes and seeing which recipes produce the best results.

Figure 4:
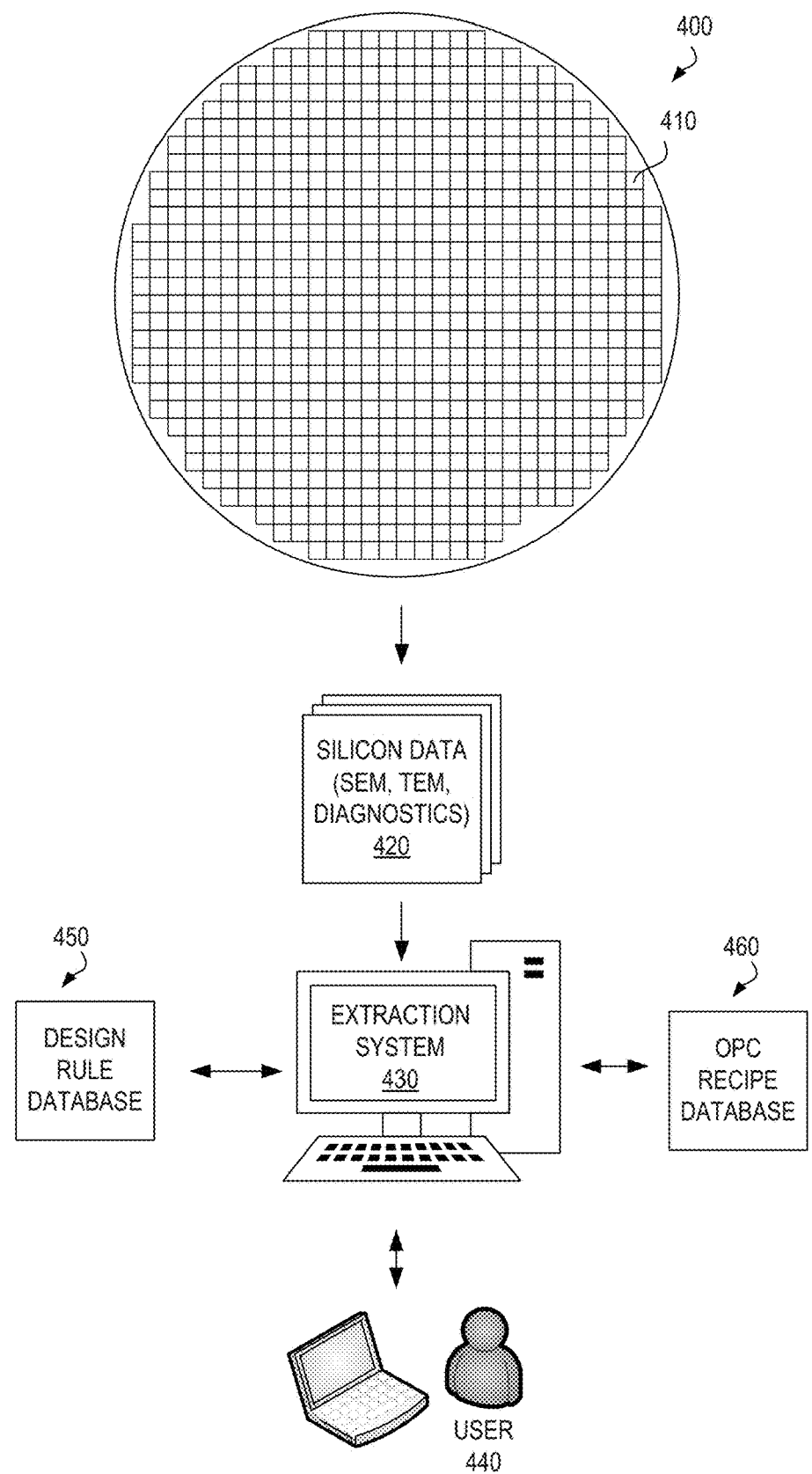
FIG. 4 illustrates an embodiment of silicon data capture and utilization of silicon data to aid semiconductor manufacturing process development in accordance with certain embodiments.

FIG. 4 illustrates an embodiment of silicon data capture and utilization of silicon data to aid semiconductor manufacturing process development. Silicon wafer 400 comprises dies 410. As discussed earlier, current technology nodes employ 300 mm wafers, which can comprise hundreds of dies. The dies are separated by scribe lines that can contain test structures that can be used to monitor the health of manufacturing process and that are consumed by the dicing process, where a wafer is cut into individual dies 410. During the manufacture of silicon wafer 400, silicon data 420 can be generated that can be used for the development of a new process or to monitor the health of a mature one. Silicon data 420 can be any data collected during the manufacturing of wafer 400, such as diagnostic data or images captured by an imaging tool such as a such as a scanning electron microscope (SEM), a transmission electron microscope (TEM), a scanning transmission electron microscope (STEM), an optical microscope, or a focus ion beam microscope (FIB). Diagnostic data can include data collected from the scribe line test structures, which can measure electrical properties of varies features or layers (e.g., contact or via resistance, metal layer sheet resistance), or indicate the presence of manufacturing defects by testing for shorts between, for example, gate or metal structures that reflect minimum features or layout patterns of concern.

Any number of images can be generated per wafer. Images can be taken of one or more areas of interest on an individual die for various die on a wafer. For example, images may be taken of the gate layer in a region where the gate patterns are particularly dense (such as in a memory array) and for representative dies across the wafer to capture cross-wafer manufacturing variations. Images can be taken at any point in the manufacturing process. As images can capture a field of view that is hundreds of microns in length and width, individual images can contain many instances of minimum features or areas of interest.

Silicon data 420 can be generated for wafers processed during process development or monitoring and can be generated for wafers processed across fabrication facilities to evaluate cross-facility manufacturing robustness. Given today's large wafer sizes, process complexities, and wafer run rates, the amount of silicon data that can be produced during process development or monitoring can be tremendous. The number of images generated during process development alone can reach into the millions.

Silicon data 420 can be supplied to a semantic pattern extraction system 430 that digests copious amounts of silicon data and presents to a process engineer or other user 440 information that may useful in developing a new process or improving an existing one. In some examples, the information provided can be semantic patterns (phrases or sentences that are easily understandable by a human) that suggest which physical design patterns or geometries may be responsible for a defect. In other examples, system 430 can utilize the silicon data 420 to determine one or more design rules that may improve process yield and update design rule database 450 for a process or update an OPC recipe database 460 by updating an existing OPC recipe or creating a new one that may improve yield.

Silicon data 420 or some other data set may comprise a labelled dataset. For example, the dataset may comprise a plurality of images of one or more semiconductor chips and each image may be labelled with a binary label indicating whether the image includes at least one defect. When a large number of contributors towards an error signal (e.g., where the error signal may include the images with defects, portions of such images, or other information derived from the images) are present, a particularly dominant contributor may shadow the effects of other critical, but non-dominant, error contributor. In a worst case scenario, the dominant contributor may be false signal, leading to the masking of the actual error signal thus producing erroneous conclusions.

In particular embodiments of the present disclosure, iterative clustering techniques may enable the identification of critical, but non-dominant error contributors. The clustering techniques may allow for region specific error threshold tuning that allows the system to suppress the effect of dominant error contributors in order to identify additional error contributors. In particular embodiments, the iterative clustering techniques may be used to improve the accuracy of optical inspection of semiconductor wafers by identifying patterns causing false defects and then optimizing critical thresholds for such patterns in order to amplify the error signal for non-dominant patterns.

Figure 5:
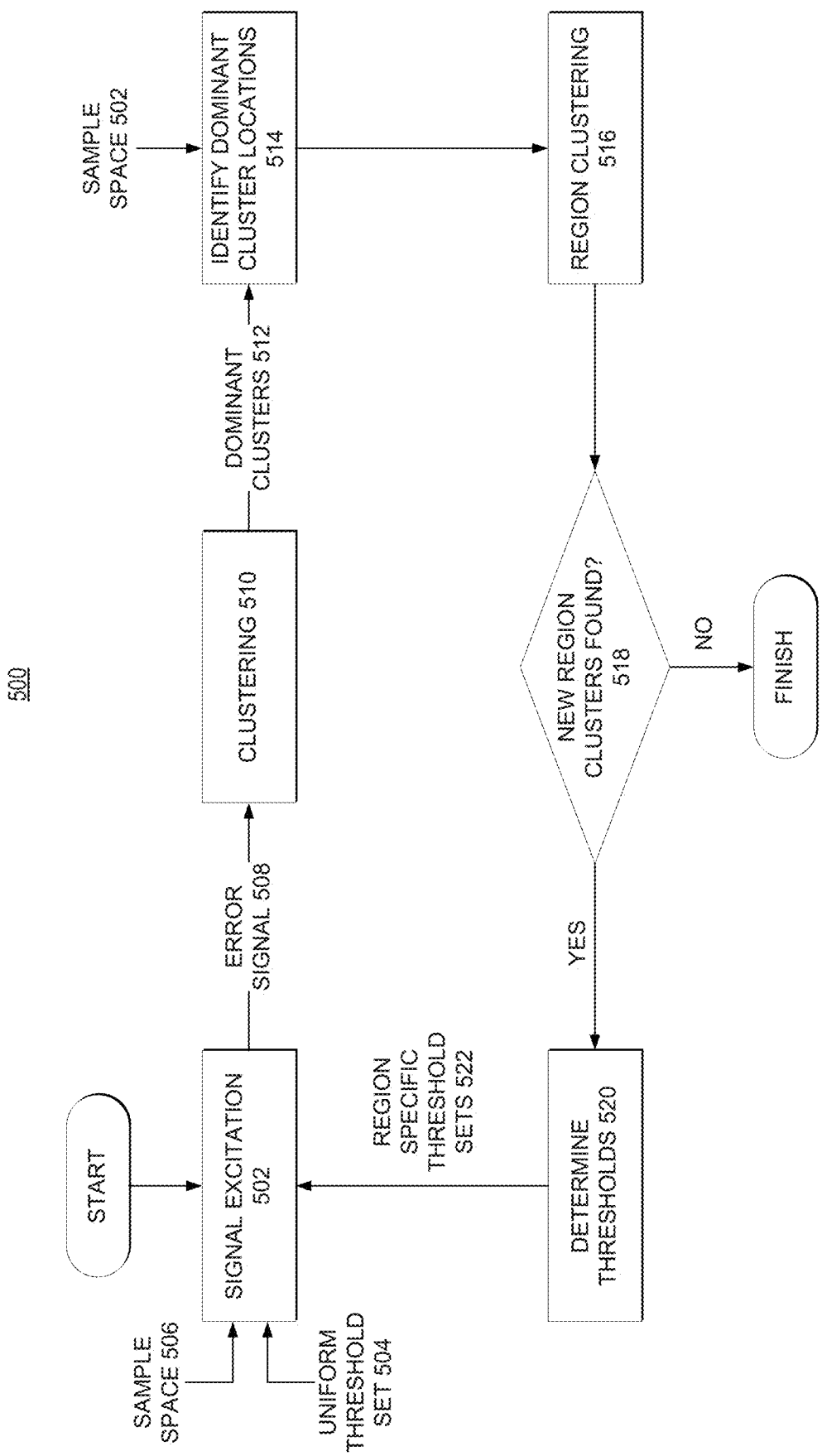
FIG. 5 illustrates a flow for identifying non-dominant clusters in accordance with certain embodiments.
Figure 6:
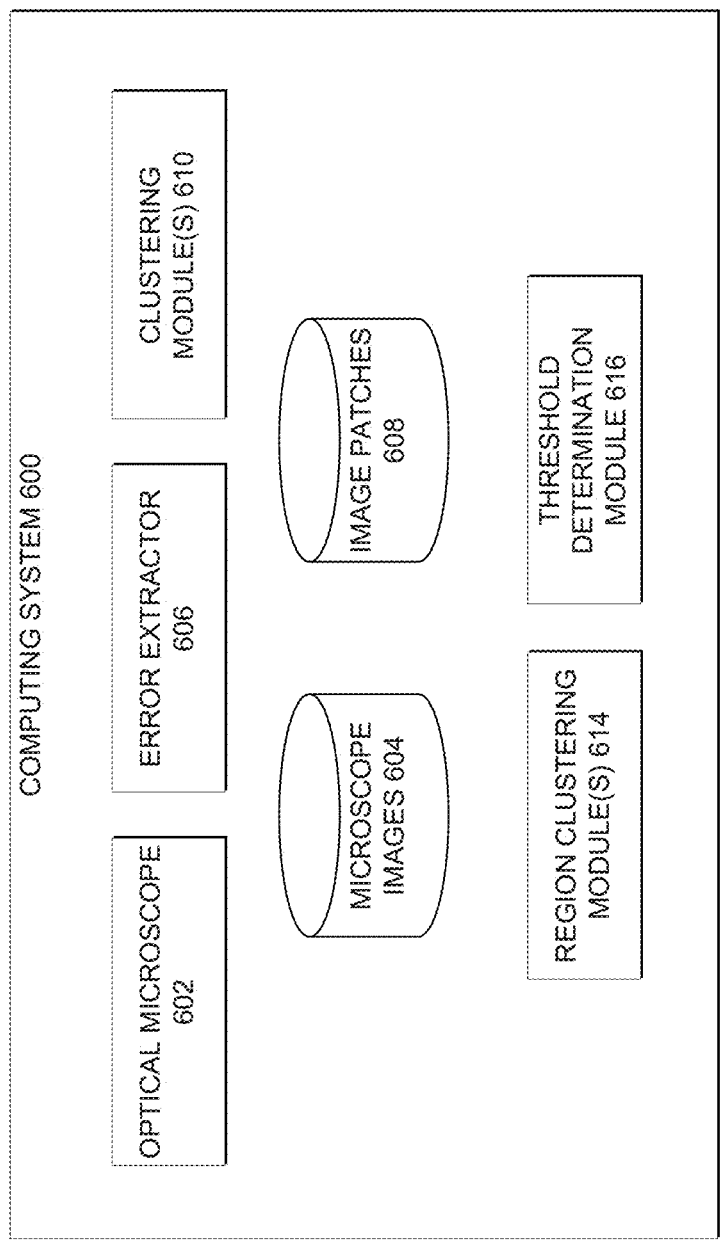
FIG. 6 illustrates a computing system for identifying non-dominant clusters in accordance with certain embodiments.

FIG. 5 illustrates a flow 500 for identifying non-dominant clusters in accordance with certain embodiments. The flow 500 may be performed by any suitable computing system, such as computing system 600 of FIG. 6 or computing system 700 of FIG. 7. Although the flow 500 may be performed by any suitable computing system, the flow will be described with reference to the computing system of FIG. 6. FIG. 6 illustrates a computing system 600 for identifying non-dominant clusters in accordance with certain embodiments.

The flow begins at 502 with signal excitation. During signal excitation, a sample space 506 is broken up into data instances and analyzed based on a uniform threshold set 504. The sample space 506 may include data instances to be labeled by the flow 500. As one example, during the flow, the data instances may each first be labeled with a binary classification indicating, e.g., whether the data instance includes a defect and may (e.g., in cases where the data instance include a defect that is found with sufficient regularity) further be labeled as having a specific type of defect. In a particular embodiment, the sample space 506 may include one or more semiconductor wafers or portions thereof.

In a particular embodiment, the signal excitation may be performed by optical microscope 602. Optical microscope 602 may comprise a microscope that utilizes light (e.g., visual or ultraviolet light) and a system of lenses to magnify images. The optical microscope 602 may enable excitation of the wafer at any suitable wavelength. The optical microscope 602 may utilize any suitable observation or contrasting techniques, such as, for example, brightfield, darkfield, simple polarizing, or differential interference contrast. Optical microscope 602 may use any suitable illumination source such as halogen illumination, xenon lamps, mercury lamps, mixed-gas illumination, or other suitable illumination. Optical microscope 602 may capture digital images of portions of semiconductor wafers at any suitable resolution. These images may be stored in any suitable memory (e.g., microscope image database 604). In various embodiments, the optical microscope 602 may include or be coupled to a robotic system that facilitates the automatic scanning of images across one or more semiconductor wafers.

In various embodiments, the optical microscope 602 may capture images at any suitable resolution. In particular embodiments, the images captured by optical microscope 602 may each captures one reticle (e.g., roughly 25×50 millimeters in some implementations), two reticles (e.g., roughly 50×50 millimeters in some implementations), or other suitable number of reticles. In particular embodiments, the images may be captured via a raster scan across the entire wafer. In various embodiments, each image may capture a portion of a semiconductor die, a single semiconductor die, or multiple semiconductor dies.

During the signal excitation phase, an error signal 508 may be generated. In one example, error extractor module 606 may generate the error signal 508. Error extractor module 606 may receive data instances, e.g., images taken by optical microscope 602, and analyze the data instances to determine which portions of the data instances include errors. In various embodiments, the error extractor 606 and the optical microscope 602 may be resident on the same device (e.g., a microscope system) or may be resident on different devices.

In addition to the data instances (e.g., images) of the sample space 506, a uniform threshold set 504 is an input to the signal excitation phase. The uniform threshold set comprises one or more thresholds used to determine whether a portion of an image (e.g., an image patch) includes a defect. In a particular embodiment, an input image may be segmented into multiple image patches, and each image patch may be analyzed to determine whether the image patch includes a defect. In some embodiments, the image patches may be rectangles or squares having width and height anywhere from about 1.5 microns to 10 microns, although any suitable image patch sizes are contemplated herein.

In various embodiments, the one or more thresholds of the uniform threshold set 504 may be set sufficiently low so as to promote detection of an adequate number of errors across the wafer. Error extractor module 606 may segment an image into many different image patches and then perform image analysis on each image patch to determine whether the image patch includes an error based on a comparison of image analysis results with one or more thresholds of the uniform threshold set 504. In a particular embodiment, the error extractor module 606 may analyze an image patch with respect to one or more other corresponding image patches to determine whether the one or more thresholds are exceeded. In various embodiments, a first image patch may correspond to a second image patch if, for example, the second image patch is an image from the same location of the first image patch but from a different wafer, if the second image patch is from the same location of the first image patch but from a different die (on the same or a different wafer), or if the second image patch is otherwise expected to match the first image patch (e.g., the second image patch is an image of the same pattern as the first image patch or the second image patch is a synthetic image generated from a design pattern used to fabricate the pattern captured by the first image patch).

The image analysis may compare one or more image analysis metrics obtained from an image set (e.g., an image patch or portion thereof and corresponding image patches or portions thereof) against one or more thresholds of the uniform threshold set 504. As one example, an image intensity (e.g., an average or sum of brightness or darkness metrics of pixels of the image) may be determined for an image portion and then compared against one or more image intensities determined for one or more corresponding image portions to generate the image analysis metric. In various embodiments, an image patch may be segmented into multiple areas and an average pixel intensity may be computed for each area and then compared against corresponding average pixel intensities from corresponding images. If any of the averages have a difference that is over the threshold, the image patch may be deemed to include a defect. In some embodiments, the image analysis metric for a particular image portion may comprise the difference between the image intensity for the particular image portion and the mean or median of the image intensities of the other images of the image set (or all of the images of the image set). In general, if one image portion differs enough from a corresponding image portion or corresponding image portions such that the uniform threshold is exceeded, one of the images may be deemed to include a defect.

In another example, areas of one or more polygons within an image patch or a portion of an image patch are compared with areas of one or more polygons within a corresponding image patch or portion thereof and if the difference in the areas (or statistic based on the areas, such as an average of the areas or other derived statistic) is greater than a threshold of the uniform threshold set, one of the image patches is deemed to include a defect.

In a particular embodiment, image patches may be analyzed together in sets of three corresponding images (or other suitable number) from different chips and if an image portion of one image patch differs from the other two (or other number of) corresponding image patches by an amount that is over the threshold (e.g., based on comparison of pixel intensities and/or polygon areas and/or other comparison of an image analysis metric), the image portion is deemed to have an error. In some embodiments, when a first image is determined to be different from a second image and a third image, but the second image and the third image are determined to be relatively similar, a determination that the first image includes the defect may be made.

In a particular embodiment, the error signal 508 may include the image patches that include defects. In various embodiments, the error signal 508 also includes the image patches that did not have errors that correspond to the image patches that did have errors. In some embodiments, by omitting the image patch sets that did not include defects (rather than communicating all of the image patches), communication, storage, and/or processing bandwidth may be preserved.

At 510, clustering is performed, e.g., by one or more clustering modules 610, on the error signal (e.g., image patches comprising defects). During clustering, the image patches may be organized into clusters, where a particular cluster may represent a particular type of defect. Based on the clustering, defect labels may be assigned to the image patches. In a particular embodiment, any defect found in this first pass may be assumed to be a dominant defect as this term is used herein.

Prior to the actual clustering, clustering module(s) 610 or other suitable circuitry of a computing system (e.g., 600) may generate a feature vector for each image patch that has been determined to have a defect. This generation may include extraction of one or more feature values from the image patch. Any suitable features values may be extracted from the error signal 508, such as values of photometric features (e.g., characteristics of pixel intensities such as an intensity histogram, variance of intensities of an image patch, a log likelihood of intensities, a total variance of an image patch) or Eigenface-based features (e.g., eigenvectors representing the images).

In various embodiments and at any stage (or multiple stages of the flow), a record corresponding to an image patch may be stored in any suitable memory (e.g., image patches database 608). Such a record may include or be associated with any one or more of an identifier of the image patch, the image patch itself, one or more corresponding image patches or identifications thereof, location information (e.g., indicating a wafer, a chip, and/or a location within a chip that is represented by the image patch), the extracted feature values for the data instance, whether the image patch includes a defect, and a defect type assigned to the sample value (e.g., as assigned after clustering is performed at 510).

After the feature values are extracted, one or more clustering models are executed to cluster the image patches based on the feature values. In some embodiments, machine learning algorithms may be performed over the feature vectors to identify the dominant types of defects. Any suitable clustering model may be used depending on the nature of the feature vector (e.g., continuous or discrete) and the error signal (e.g., continuous or discrete). At least some of the image patches may be assigned to clustering classes based on their positions in a data space (where the position of an image patch is determined using a function that considers all (or a subset) of the feature values of the image patch). During the clustering at 510, the image patches that are part of an identified cluster are classified with a defect type corresponding to that cluster.

Any suitable clustering models may be used to partition the data instances into clusters and assign clustering classes. For example, a random forest model, connectivity model (e.g., hierarchical clustering), centroid model (e.g., K-Means clustering), distribution model (e.g., expectation-maximization using multivariate normal distributions), or density model (e.g., DBSCAN or OPTICS) may be used. The models may use any suitable parameters for determining what constitutes a cluster (in some embodiments, these parameters may be tuned over time based on additional error verification steps, e.g., using SEM or similar images and/or user input).

In some embodiments, multiple clustering models are used (e.g., each clustering module 610 may implement a different clustering model) and the results may be fused to determine the clustering classes assigned to the records. When multiple models are used and fused together, any suitable fusion method may be used. For example, a union method may be used where any cluster identified by any of the models is included in the results. As another example, a weighted method may be used where clusters may be weighted according to which clustering models identified the clusters and/or whether clusters were present in multiple models (e.g., as determined by a threshold percentage of the image patches being present in identified clusters of different clustering models). The usage of multiple different clustering models may improve the ability of the system to filter out noise in the error signal 508.

In the context of semiconductor wafer analysis, many possible defect types may be possible (e.g., in a 10 nanometer process, there may be more than 1,000 different defect types). A few examples of defect types that may be recognized using the clustering models described herein include ash flakes (which, e.g., may manifest as an unintended white blob), shorts produced by metal lines joining with each other, or a metal line with a broken portion.

In various embodiments, the clustering modules(s) 610 may assign abstract defect types (e.g., "defect type 1", "defect type 2", etc.) to the determined clusters. In some embodiments, an operator or computing entity may later determine that an abstract defect type corresponds to a known defect type (e.g., ash flake) and a description of the defect type may be stored in a database and associated with the particular defect type. In some embodiments, results of clustering 510 across different wafers and processes may be stored in a global database.

As a result of clustering 510, a plurality of dominant clusters 512 are identified. The dominant clusters may include groups of image patches that were found to have sufficiently similar image characteristics. At 514, locations of the dominant clusters within the sample space 502 are identified. This may include identifying defect location information comprising locations or regions (e.g., if an exact location is not ascertainable, a region may represent a location plus or minus a particular distance allowing deduction of the bounds within which the location is present) of image patches comprising defects that were part of a dominant cluster. The identification of the location information may allow the computing system (e.g., 600) to determine attributes of the patterns of the design file corresponding to the image patches that were part of a dominant cluster. A pattern of a design file may correspond to a layout feature of a semiconductor chip design, such as one or more geometric design patterns of an area defined in a layout database file. Any suitable database file format may be used for the layout database file, such as Graphic Data System II (GDS II), Open Artwork System Interchange Standard (OASIS), or other suitable format. A layout database file may provide a representation of a semiconductor chip in terms of planar geometric shapes (e.g., polygons) corresponding to patterns of, e.g., metal, oxide, or semiconductor layers of the chip. A layout database file may represent the physical placement of various devices on the chip. Such a file may specify the presence or absence of various features on different mask layers for masks used to produce the chip.

The attributes found in the design file for the patterns corresponding to the various dominant clusters may be used to build feature vectors, where a feature vector includes a plurality of feature values for a particular pattern (corresponding to an image patch of a dominant cluster). In the example sample space of geometrical objects of a semiconductor chip, the features may include single and/or multi-layer geometric features (e.g., metal line critical dimensions, via to metal distances, etc.) and image feature descriptors (e.g., SIFT, ORB-Oriented FAST and rotated BRIEF, a feature detector that finds corner keypoints from images, etc.), or other suitable features, such as design cell families (e.g., AND gates, NOR gates, etc.), wafer die location (e.g., closer to edges), focus-dose split, or any other suitable features of the chip design. In a particular embodiment, a feature vector with 64 different design feature values may be constructed for each pattern, although any suitable number of feature values may be used in other embodiments.

Region clustering is then performed at 516, e.g., by one or more region clustering module(s) 614. One or more clustering models are executed to cluster the design patterns based on the feature vectors to find region clusters of patterns with similar feature values. In some embodiments, machine learning algorithms may be performed over the feature vectors to identify the region clusters. In various embodiments, the design patterns may be assigned to region clustering classes based on their positions in a data space (where the position of a design pattern is determined using a function that considers all (or a subset) of the feature values of the design pattern).

Any suitable clustering models may be used to partition the design patterns into region clusters. For example, a random forest model, connectivity model (e.g., hierarchical clustering), centroid model (e.g., K-Means clustering), distribution model (e.g., expectation-maximization using multivariate normal distributions), or density model (e.g., DBSCAN or OPTICS or derivatives thereof) may be used. The models may use any suitable parameters for determining what constitutes a region cluster (e.g., how close and numerous the patterns are before a region cluster is found).

In some embodiments, multiple clustering models are used (e.g., each clustering module 614 may implement a different clustering model) and the results may be fused to determine the region clusters. When multiple models are used and fused together, any suitable fusion method may be used. For example, a union method may be used where any region cluster identified by any of the models is included in the results. As another example, a weighted method may be used where region clusters may be weighted according to which clustering models identified the region clusters and/or whether region clusters were present in multiple models (e.g., as determined by a threshold percentage of the design patterns being present in identified region clusters of different clustering models).

The region clustering module(s) 614 may identify region clusters in any suitable manner. For example, a region cluster may be identified by a range of one or more feature values for each feature of the feature vector (or a subset of the feature values). As another example, a region cluster may be identified by a single feature value (e.g., all patterns of a particular design cell family, such as an AND gate, may correspond to a region cluster).

At 518, a determination is made as to whether new region clusters have been found (that were not identified in any previous iteration of flow 500). If no new region clusters have been found, the flow ends. If new region clusters have been found, the flow moves to 520. In general, the uniform threshold 504 is set low enough such that at least one region cluster (and possibly many region clusters) is found during the first iteration of the flow.

At 520, at least one region specific threshold is determined, e.g., by a threshold determination module 616. For example, the locations of the die that include the design patterns included within a region cluster may be identified in order to determine which image patch the design patterns will be captured in. For example, if a region cluster corresponds to a particular design cell family, all locations of that design cell family may be identified as a region. As another example, if a region cluster corresponds to all metal lines having a length within a particular range that are within a certain distance from the perimeter of the die, all instances of those metal lines may be identified as another region. The identification of the locations of the design patterns of the region clusters allow the error extractor module 606 to determine which image patches correspond to these locations and to apply different error thresholds (than the uniform threshold set) to these image patches.

At 520, a region specific threshold set 522 that includes one or more thresholds that are different from the one or more thresholds of the uniform threshold set 504 are assigned to one or more of the identified regions. In a particular embodiment, the same one or more thresholds may be assigned to each identified region. In other embodiments, different thresholds may be assigned to different regions. The region specific error thresholds assigned to the identified regions may be higher than the one or more thresholds of the uniform threshold set in order to suppress error signals from these regions. In particular embodiments, error signals for the remaining regions of the die not covered by the identified regions may again be assigned to the uniform threshold set 504. In other embodiments, one or more of the region-specific thresholds may be lowered below the uniform threshold 504 (e.g., if less dominant clusters than expected were identified during the first iteration).

Figure 9:
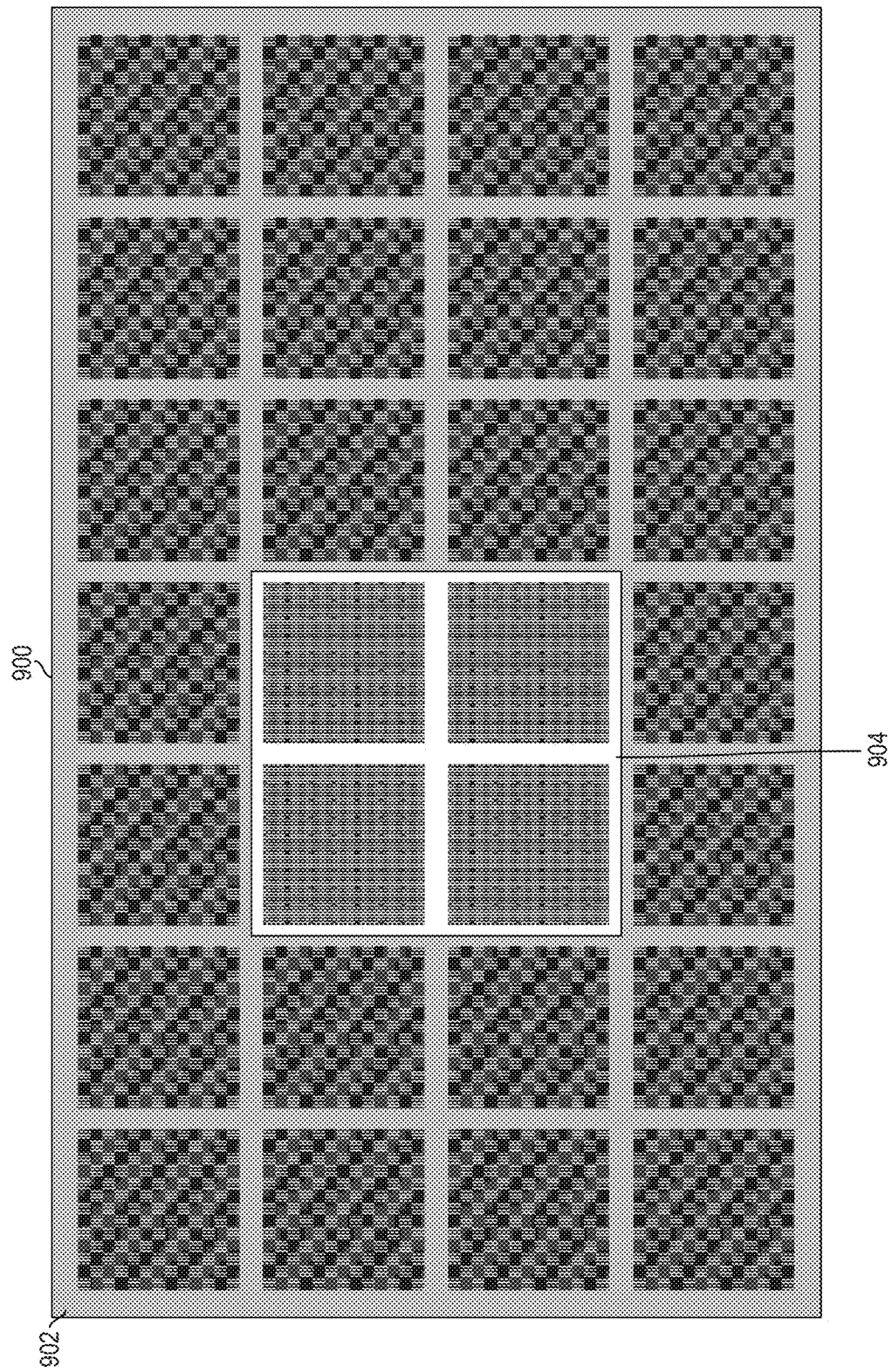
FIG. 9 illustrates regional clustering in accordance with certain embodiments.

FIG. 9 illustrates region clustering of a portion 900 of a semiconductor chip in accordance with certain embodiments. In this example, two different regions 902 and 904 are depicted. The first region 902 includes multiple instances of a first pattern and the second region 904 includes multiple instances of a second pattern. As an example, the second region may be a region of the die which include patterns of a region cluster and the first region may be a region of the die which does not include patterns of any region cluster. Accordingly, a higher error threshold (or thresholds) may be assigned to the second region to suppress the error signal from these regions such that additional defects may be found in subsequent iterations of flow 500.

Referring again to FIG. 5, after the thresholds are assigned at 520, the flow is repeated. The signal excitation and error detection (using the variable threshold form) is now used to get a biased error signal that suppresses the dominant error signals that were present in the first iteration. The clustering operations performed on this modified error signal now allows discovery of the critical, but non-dominant, patterns.

In some embodiments, during each iteration, any additional regions found to have design patterns of a newly found region cluster may be assigned to one or more thresholds that are slightly lower than the thresholds assigned to the newly identified region clusters of the previous iteration to facilitate the discovery of additional defects that may be slightly higher than such thresholds but not as dominant as these region clusters. In various embodiments, the thresholds assigned to particular regions are persistent as the flow progresses. For example, the thresholds assigned to the regions during the first iteration continue to be valid during future iterations of the flow, as are the thresholds assigned to regions during the second iteration and so on. The flow may continue to be repeated until no additional region clusters are found.

In some embodiments, after the flow is completed (or at any suitable time during the flow), information identifying the defects found and the locations of the defects may be communicated to any suitable entity. For example, such information may be presented to a user via an electronic display to facilitate analysis of the die. As another example, such information may be provided to another analysis tool, such as a computing system that utilizes an SEM or other imaging tool to further investigate the defects found using the optical microscope.

Figure 7:
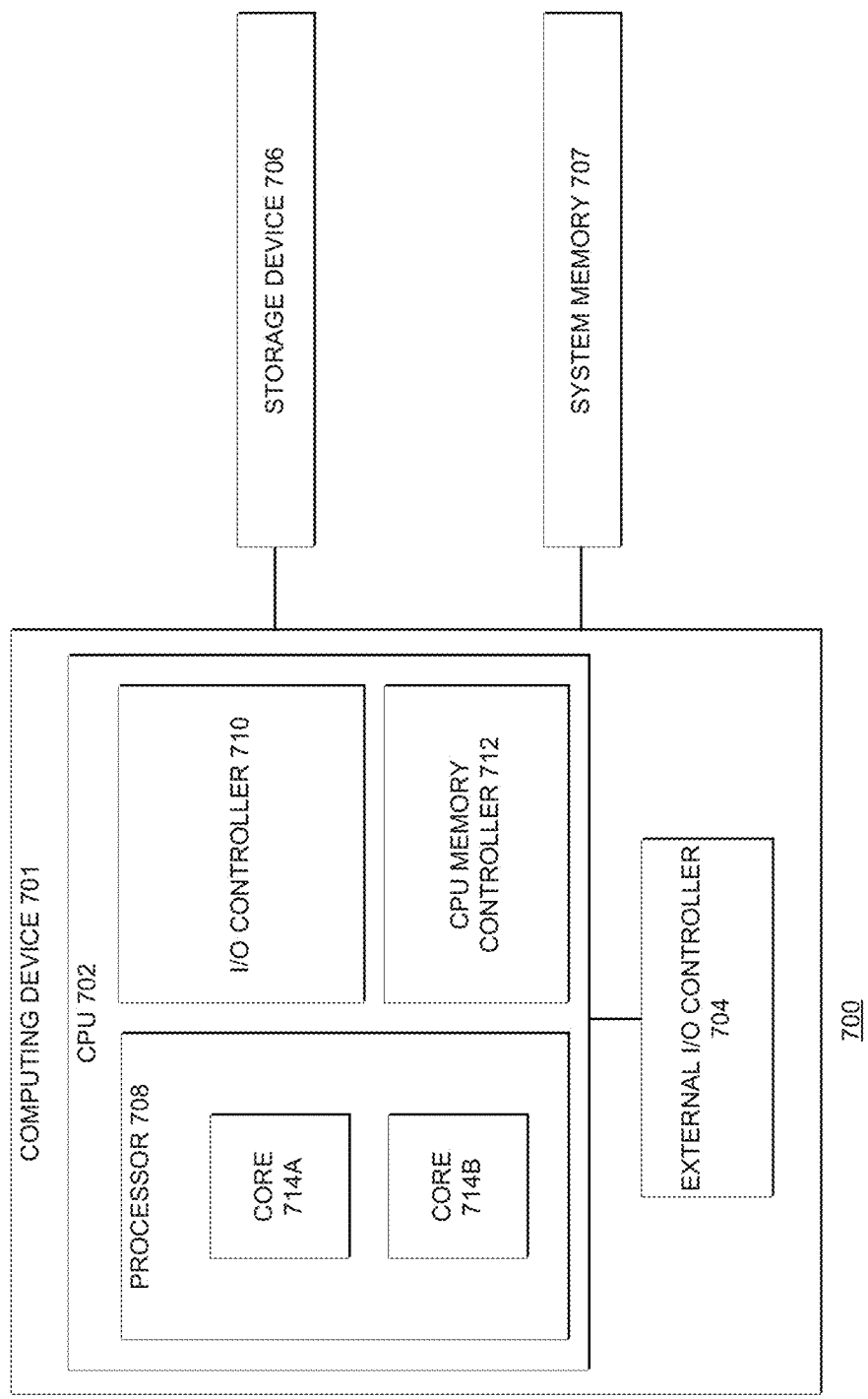
FIG. 7 illustrates a computing system in accordance with certain embodiments.

FIG. 7 illustrates a computing system 700 in accordance with certain embodiments. Any suitable components of system 700 may be used to perform any of the functions described herein, e.g., in connection with FIG. 5 or 8. In a particular embodiment, the components of computing system 600 may be implemented using components of computing system 700. In some embodiments, extraction system 430 or a computing system utilized by a user 440 to communicate with extraction system 430 may implement one or more components of system 700. System 700 includes a computing device 701 comprising a central processing unit (CPU) 702 coupled to an external input/output (I/O) controller 704, storage device 706 (which in some embodiments may store at least a portion of silicon data 420 and/or database 604), and system memory 707. Although various components are illustrated, computing system 700 may include additional other components or multiples of the components illustrated.

During operation, data may be transferred between storage device 706 or system memory 707 and the CPU 702. In various embodiments, particular data operations (e.g., erase, program, and read operations) involving a storage device 706 or system memory 707 may be managed by an operating system or other software application executed by processor 708.

CPU 702 comprises a processor 708, such as a microprocessor, an embedded processor, a digital signal processor (DSP), a network processor, a handheld processor, an application processor, a co-processor, a system on a chip (SOC), or other device to execute code (i.e., software instructions). Processor 708, in the depicted embodiment, includes two processing elements (cores 714A and 714B in the depicted embodiment), which may include asymmetric processing elements or symmetric processing elements. However, a processor may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core 714 may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

In various embodiments, the processing elements may also include one or more arithmetic logic units (ALUs), floating point units (FPUs), caches, instruction pipelines, interrupt handling hardware, registers, or other hardware to facilitate the operations of the processing elements.

I/O controller 710 is an integrated I/O controller. I/O controller 710 may include logic for communicating data between CPU 702 and I/O devices, which may refer to any suitable devices capable of transferring data to and/or receiving data from an electronic system, such as CPU 702. For example, an I/O device may comprise an audio/video (A/V) device controller such as a graphics accelerator or audio controller; a data storage device controller, such as a flash memory device, magnetic storage disk, or optical storage disk controller; a wireless transceiver; a network processor; a network interface controller; or a controller for another input devices such as a monitor, printer, mouse, keyboard, or scanner; or other suitable device. In a particular embodiment, an I/O device may comprise a storage device 706 that may be coupled to the CPU 702 through I/O controller 710.

An I/O device may communicate with the I/O controller 710 of the CPU 702 using any suitable signaling protocol, such as peripheral component interconnect (PCI), PCI Express (PCIe), Universal Serial Bus (USB), Serial Attached SCSI (SAS), Serial ATA (SATA), Fibre Channel (FC), IEEE 802.3, IEEE 802.11, or other current or future signaling protocol. In particular embodiments, I/O controller 710 and the underlying I/O device may communicate data and commands in accordance with a logical device interface specification such as Non-Volatile Memory Express (NVMe) (e.g., as described by one or more of the specifications available at www.nvmexpress.org/specifications/) or Advanced Host Controller Interface (AHCI) (e.g., as described by one or more AHCI specifications such as Serial ATA AHCI: Specification, Rev. 1.3.1 available at http://www.intel.com/content/www/us/en/io/serial-ata/serial-ata-ahci-spec-rev1-3-1.html). In various embodiments, I/O devices coupled to the I/O controller may be located off-chip (i.e., not on the same chip as CPU 702) or may be integrated on the same chip as the CPU 702.

CPU memory controller 712 is an integrated memory controller. In various embodiments, CPU memory controller 712 may include any one or more characteristics of memory controller 110. CPU memory controller may include logic to control the flow of data going to and from one or more system memories 707. CPU memory controller 712 may include logic operable to read from a system memory 707, write to a system memory 707, or to request other operations from a system memory 707. In various embodiments, CPU memory controller 712 may receive write requests from cores 714 and/or I/O controller 710 and may provide data specified in these requests to a system memory 707 for storage therein. CPU memory controller 712 may also read data from a system memory 707 and provide the read data to I/O controller 710 or a core 714. During operation, CPU memory controller 712 may issue commands including one or more addresses of the system memory 707 in order to read data from or write data to memory (or to perform other operations). In some embodiments, CPU memory controller 712 may be implemented on the same chip as CPU 702, whereas in other embodiments, CPU memory controller 712 may be implemented on a different chip than that of CPU 702. I/O controller 710 may perform similar operations with respect to one or more storage devices 706.

The CPU 702 may also be coupled to one or more other I/O devices through external I/O controller 704. In a particular embodiment, external I/O controller 704 may couple a storage device 706 to the CPU 702. External I/O controller 704 may include logic to manage the flow of data between one or more CPUs 702 and I/O devices. In particular embodiments, external I/O controller 704 is located on a motherboard along with the CPU 702. The external I/O controller 704 may exchange information with components of CPU 702 using point-to-point or other interfaces. In various embodiments, external I/O controller 704 may include any one or more characteristics of memory controller 110.

A system memory 707 may store any suitable data, such as data used by processor 708 to provide the functionality of computer system 700. For example, data associated with programs that are executed or files accessed by cores 714 may be stored in system memory 707. Thus, a system memory 707 may include a system memory that stores data and/or sequences of instructions that are executed or otherwise used by the cores 714. In various embodiments, a system memory 707 may store persistent data (e.g., a user's files or instruction sequences) that remains stored even after power to the system memory 707 is removed. A system memory 707 may be dedicated to a particular CPU 702 or shared with other devices (e.g., one or more other processors or other devices) of computer system 700.

In various embodiments, a system memory 707 may include a memory comprising any number of memory arrays, a memory device controller (In various embodiments, the memory device controller may include any one or more characteristics of memory controller 110), and other supporting logic (not shown). A memory array may include non-volatile memory and/or volatile memory. Non-volatile memory is a storage medium that does not require power to maintain the state of data stored by the medium. Nonlimiting examples of nonvolatile memory may include any or a combination of: solid state memory (such as planar or 3D NAND flash memory or NOR flash memory), 3D crosspoint memory, memory devices that use chalcogenide phase change material (e.g., chalcogenide glass), byte addressable nonvolatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), other various types of non-volatile random access memories (RAMS), and magnetic storage memory. In some embodiments, 3D crosspoint memory may comprise a transistor-less stackable cross point architecture in which memory cells sit at the intersection of words lines and bit lines and are individually addressable and in which bit storage is based on a change in bulk resistance. Volatile memory is a storage medium that requires power to maintain the state of data stored by the medium. Examples of volatile memory may include various types of random access memory (RAM), such as dynamic random-access memory (DRAM) or static random-access memory (SRAM). One particular type of DRAM that may be used in a memory array is synchronous dynamic random-access memory (SDRAM). In some embodiments, any portion of memory 707 that is volatile memory can comply with JEDEC standards including but not limited to Double Data Rate (DDR) standards, e.g., DDR3, 4, and 5, or Low Power DDR4 (LPDDR4) as well as emerging standards.

A storage device 706 may store any suitable data, such as data used by processor 708 to provide functionality of computer system 700. For example, data associated with programs that are executed or files accessed by cores 714A and 714B may be stored in storage device 706. Thus, in some embodiments, a storage device 706 may store data and/or sequences of instructions that are executed or otherwise used by the cores 714A and 714B. In various embodiments, a storage device 706 may store persistent data (e.g., a user's files or software application code) that remains stored even after power to the storage device 706 is removed. A storage device 706 may be dedicated to CPU 702 or shared with other devices (e.g., another CPU or other device) of computer system 700.

In various embodiments, storage device 706 includes a storage device controller and one or more memory modules. In various embodiments, a memory module of storage device 706 comprises one or more NAND flash memory arrays, one or more hard disk drives, or other suitable memory storage devices. Storage device 706 may comprise any suitable type of memory and is not limited to a particular speed, technology, or form factor of memory in various embodiments. For example, a storage device 706 may be a disk drive (such as a solid-state drive), a flash drive, memory integrated with a computing device (e.g., memory integrated on a circuit board of the computing device), a memory module (e.g., a dual in-line memory module) that may be inserted in a memory socket, or other type of storage device. Moreover, computer system 700 may include multiple different types of storage devices. Storage device 706 may include any suitable interface to communicate with CPU memory controller 712 or I/O controller 710 using any suitable communication protocol such as a DDR-based protocol, PCI, PCIe, USB, SAS, SATA, FC, System Management Bus (SMBus), or other suitable protocol. A storage device 706 may also include a communication interface to communicate with CPU memory controller 712 or I/O controller 710 in accordance with any suitable logical device interface specification such as NVMe, AHCI, or other suitable specification. In particular embodiments, storage device 706 may comprise multiple communication interfaces that each communicate using a separate protocol with CPU memory controller 712 and/or I/O controller 710.

In some embodiments, all, or some of the elements of system 700 are resident on (or coupled to) the same circuit board (e.g., a motherboard). In various embodiments, any suitable partitioning between the elements may exist. For example, the elements depicted in CPU 702 may be located on a single die (i.e., on-chip) or package or any of the elements of CPU 702 may be located off-chip or off-package. Similarly, the elements depicted in storage device 706 may be located on a single chip or on multiple chips. In various embodiments, a storage device 706 and a computing device (e.g., CPU 702) may be located on the same circuit board or on the same device and in other embodiments the storage device 706 and the computing device may be located on different circuit boards or devices.

The components of system 700 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, and a Gunning transceiver logic (GTL) bus. In various embodiments, an integrated I/O subsystem includes point-to-point multiplexing logic between various components of system 700, such as cores 714, one or more CPU memory controllers 712, I/O controller 710, integrated I/O devices, direct memory access (DMA) logic (not shown), etc. In various embodiments, components of computer system 700 may be coupled together through one or more networks comprising any number of intervening network nodes, such as routers, switches, or other computing devices. For example, a computing device (e.g., CPU 702) and the storage device 706 may be communicably coupled through a network.

Although not depicted, system 700 may use a battery and/or power supply outlet connector and associated system to receive power, a display to output data provided by CPU 702, or a network interface allowing the CPU 702 to communicate over a network. In various embodiments, the battery, power supply outlet connector, display, and/or network interface may be communicatively coupled to CPU 702. Other sources of power can be used such as renewable energy (e.g., solar power or motion based power).

Figure 8:
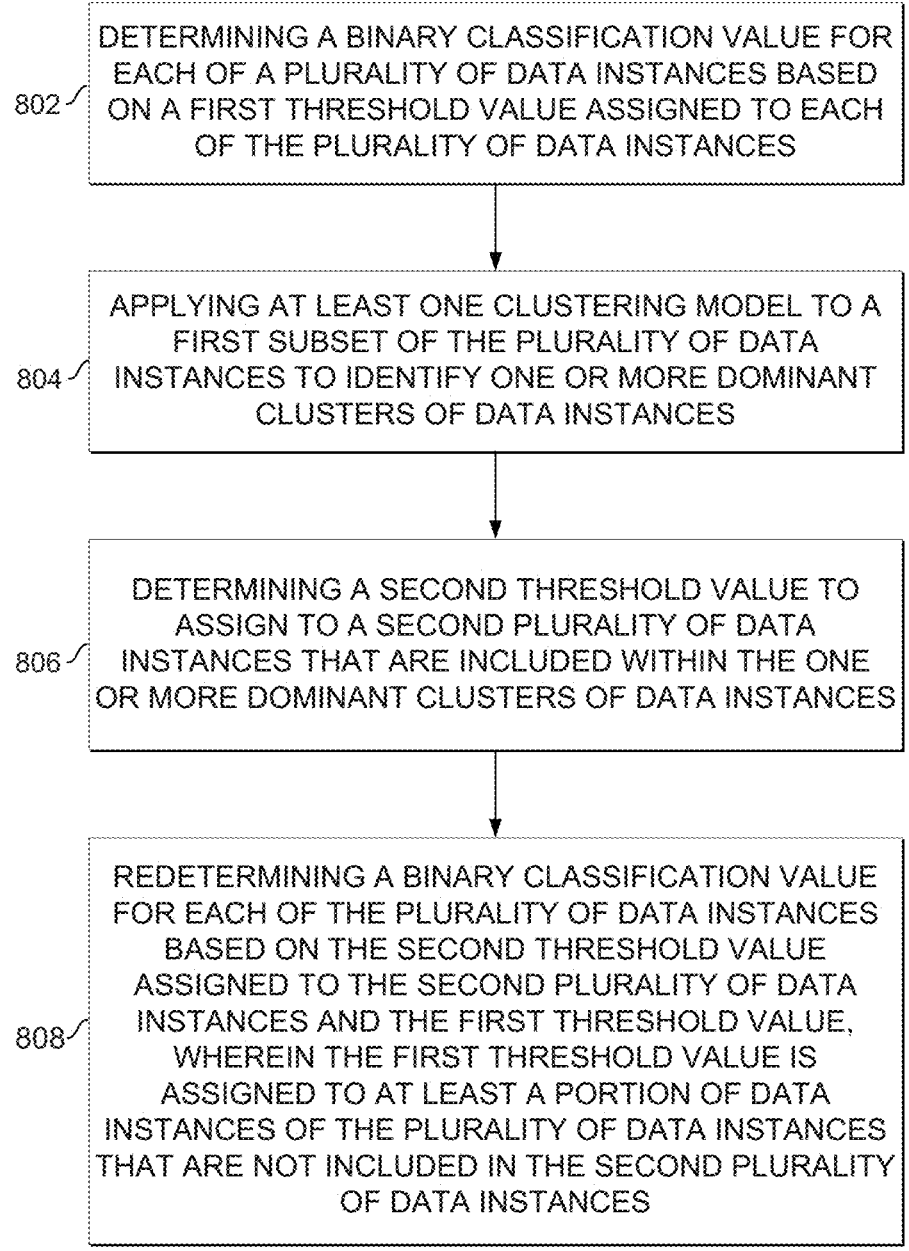
FIG. 8 illustrates an additional flow for identifying non-dominant clusters in accordance with certain embodiments.

FIG. 8 illustrates a flow for identifying non-dominant clusters in accordance with certain embodiments. The flow may be performed by any suitable computing system, such as those described herein.

802 comprises determining a binary classification value for each of a plurality of data instances based on a first threshold value assigned to each of the plurality of data instances. 804 comprises applying at least one clustering model to a first subset of the plurality of data instances to identify one or more dominant clusters of data instances. 806 comprises determining a second threshold value to assign to a second plurality of data instances that are included within the one or more dominant clusters of data instances. 808 comprises redetermining a binary classification value for each of the plurality of data instances based on the second threshold value assigned to the second plurality of data instances and the first threshold value, wherein the first threshold value is assigned to at least a portion of data instances of the plurality of data instances that are not included in the second plurality of data instances.

Although the present disclosure describes various embodiments useful in the context of semiconductor manufacturing, the embodiments may be used in other contexts for any suitable objects or measurements. For example, the methods described herein may be adapted to identify hidden meaningful clusters within labeled data (e.g., data that has been tagged with a binary classification). For example, clustering of words may be performed to classify a collection of texts, and certain words that are found as dominant may be suppressed in future clustering operations in order to consider clustering of other key words used to classify the texts. In some embodiments, there may be a binary classification of the texts (e.g., as fiction or non-fiction) followed by a classification of the texts into certain types of genres based on the clustering of key words (and this latter classification may be iterative wherein certain key words are suppressed during later iterations).

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

In various embodiments, a medium storing a representation of the design may be provided to a manufacturing system (e.g., a semiconductor manufacturing system capable of manufacturing an integrated circuit and/or related components). The design representation may instruct the system to manufacture a device capable of performing any combination of the functions described above. For example, the design representation may instruct the system regarding which components to manufacture, how the components should be coupled together, where the components should be placed on the device, and/or regarding other suitable specifications regarding the device to be manufactured.

A module as used herein refers to circuitry and any combination of hardware, software, and/or firmware. As an example, a module includes hardware (comprising circuitry), such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Logic may be used to implement any of the flows described or functionality of the various components such as computing system 600, CPU 702, external I/O controller 704, processor 708, cores 714A and 714B, I/O controller 710, CPU memory controller 712, storage device 706, system memory 707, subcomponents thereof, or other entity or component described herein. "Logic" may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a storage device containing instructions, combinations of logic devices (e.g., as would be found on a printed circuit board), or other suitable hardware and/or software. Logic may include one or more gates or other circuit components. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in storage devices.

Use of the phrase 'to' or 'configured to,' in one embodiment, refers to arranging, putting together, manufacturing, offering to sell, importing, and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e., set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash storage devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. Example 1 is at least one machine readable storage medium having instructions stored thereon, the instructions when executed by a machine to cause the machine to, determine a binary classification value for each of a plurality of data instances based on a first threshold value assigned to each of the plurality of data instances; apply at least one clustering model to a first subset of the plurality of data instances to identify one or more dominant clusters of data instances; determine a second threshold value to assign to a second plurality of data instances that are included within the one or more dominant clusters of data instances; and redetermine a binary classification value for each of the plurality of data instances based on the second threshold value assigned to the second plurality of data instances and the first threshold value, wherein the first threshold value is assigned to at least a portion of data instances of the plurality of data instances that are not included in the second plurality of data instances.

Example 2 may include the subject matter of example 1, wherein the plurality of data instances are images and the first threshold value corresponds to a pixel intensity difference.

Example 3 may include the subject matter of any of examples 1-2, wherein the first threshold value corresponds to a polygon area difference.

Example 4 may include the subject matter of any of examples 1-3, wherein the plurality of data instances comprise image patches of an image of a semiconductor wafer taken by an optical microscope.

Example 5 may include the subject matter of any of examples 1-4, wherein a binary classification value determined for a data instance indicates whether the data instance includes a defect.

Example 6 may include the subject matter of any of examples 1-5, the instructions when executed by a machine to cause the machine to access a design file to construct feature vectors for the data instances of the one or more dominant clusters; and apply at least one clustering model to the feature vectors to determine region clusters.

Example 7 may include the subject matter of example 6, the instructions when executed by a machine to cause the machine to assign the second threshold value to data instances corresponding to the determined region clusters.

Example 8 may include the subject matter of example 7, the instructions when executed by a machine to cause the machine to assign the first threshold value to all remaining data instances of the plurality of data instances that do not correspond to the determined region clusters.

Example 9 may include the subject matter of any of examples 1-8, wherein applying at least one clustering model to the first subset of the plurality of data instances to identify one or more dominant clusters of data instances comprises clustering the first subset of the plurality of data instances based on one or more image analysis metrics.

Example 10 may include the subject matter of example 1, wherein the plurality of data instances comprise a plurality of text collections and wherein a binary classification value determined for a data instance indicates whether the data instance is non-fiction or fiction.

Example 11 is a method comprising determining a binary classification value for each of a plurality of data instances based on a first threshold value assigned to each of the plurality of data instances; applying at least one clustering model to a first subset of the plurality of data instances to identify one or more dominant clusters of data instances; determining a second threshold value to assign to a second plurality of data instances that are included within the one or more dominant clusters of data instances; and redetermining a binary classification value for each of the plurality of data instances based on the second threshold value assigned to the second plurality of data instances and the first threshold value, wherein the first threshold value is assigned to at least a portion of data instances of the plurality of data instances that are not included in the second plurality of data instances.

Example 12 may include the subject matter of example 11, wherein the plurality of data instances are images and the first threshold value corresponds to a pixel intensity difference.

Example 13 may include the subject matter of any of examples 11-12, wherein the first threshold value corresponds to a polygon area difference.

Example 14 may include the subject matter of any of examples 11-13, wherein the plurality of data instances comprise image patches of an image of a semiconductor wafer taken by an optical microscope.

Example 15 may include the subject matter of any of examples 11-14, wherein a binary classification value determined for a data instance indicates whether the data instance includes a defect.

Example 16 may include the subject matter of any of examples 11-15, further comprising accessing a design file to construct feature vectors for the data instances of the one or more dominant clusters; and applying at least one clustering model to the feature vectors to determine region clusters.

Example 17 may include the subject matter of example 16, further comprising assigning the second threshold value to data instances corresponding to the determined region clusters.

Example 18 may include the subject matter of example 17, assigning the first threshold value to all remaining data instances of the plurality of data instances that do not correspond to the determined region clusters.

Example 19 may include the subject matter of any of examples 11-18, wherein applying at least one clustering model to the first subset of the plurality of data instances to identify one or more dominant clusters of data instances comprises clustering the first subset of the plurality of data instances based on one or more image analysis metrics.

Example 20 may include the subject matter of example 11, wherein the plurality of data instances comprise a plurality of text collections and wherein a binary classification value determined for a data instance indicates whether the data instance is non-fiction or fiction.

Example 21 is a system comprising a memory to store a plurality of data instances; and a processor coupled to the memory, the processor to determine a binary classification value for each of the plurality of data instances based on a first threshold value assigned to each of the plurality of data instances; apply at least one clustering model to a first subset of the plurality of data instances to identify one or more dominant clusters of data instances; determine a second threshold value to assign to a second plurality of data instances that are included within the one or more dominant clusters of data instances; and redetermine a binary classification value for each of the plurality of data instances based on the second threshold value assigned to the second plurality of data instances and the first threshold value, wherein the first threshold value is assigned to at least a portion of data instances of the plurality of data instances that are not included in the second plurality of data instances.

Example 22 may include the subject matter of example 21, wherein the plurality of data instances are images and the first threshold value corresponds to a pixel intensity difference.

Example 23 may include the subject matter of any of examples 21-22, wherein the first threshold value corresponds to a polygon area difference.

Example 24 may include the subject matter of any of examples 21-23, wherein the plurality of data instances comprise image patches of an image of a semiconductor wafer taken by an optical microscope.

Example 25 may include the subject matter of any of examples 21-24, wherein a binary classification value determined for a data instance indicates whether the data instance includes a defect.

Example 26 may include the subject matter of any of examples 21-25, the processor to access a design file to construct feature vectors for the data instances of the one or more dominant clusters; and apply at least one clustering model to the feature vectors to determine region clusters.

Example 27 may include the subject matter of example 26, the processor to assign the second threshold value to data instances corresponding to the determined region clusters.

Example 28 may include the subject matter of example 27, processor to assign the first threshold value to all remaining data instances of the plurality of data instances that do not correspond to the determined region clusters.

Example 29 may include the subject matter of any of examples 21-28, wherein applying at least one clustering model to the first subset of the plurality of data instances to identify one or more dominant clusters of data instances comprises clustering the first subset of the plurality of data instances based on one or more image analysis metrics.

Example 30 may include the subject matter of example 21, wherein the plurality of data instances comprise a plurality of text collections and wherein a binary classification value determined for a data instance indicates whether the data instance is non-fiction or fiction.

Example 31 may include the subject matter of any of examples 21-30, the system further comprising an optical microscope to capture the plurality of data instances.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. At least one non-transitory machine readable storage medium having instructions stored thereon, the instructions when executed by a machine to cause the machine to:
   determine a binary classification value for each of a plurality of data instances based on a first threshold value assigned to each of the plurality of data instances;
   apply at least one clustering model to a first subset of the plurality of data instances to identify one or more dominant clusters of data instances;
   determine a second threshold value to assign to a second plurality of data instances that are included within the one or more dominant clusters of data instances; and
   redetermine the binary classification value for each of the plurality of data instances, wherein the redetermination comprises determining, based on the second threshold value assigned to the second plurality of data instances, the binary classification value for each of the second plurality of data instances and determining, based on the first threshold value, the binary classification value for each of at least a portion of data instances of the plurality of data instances that are not included in the second plurality of data instances.

2. The at least one medium of claim 1, wherein the plurality of data instances are images and the first threshold value corresponds to a pixel intensity difference.

3. The at least one medium of claim 1, wherein the first threshold value corresponds to a polygon area difference.

4. The at least one medium of claim 1, wherein the plurality of data instances comprise image patches of an image of a semiconductor wafer taken by an optical microscope.

5. The at least one medium of claim 1, wherein the binary classification value determined and redetermined for each of the plurality of data instances is whether the data instance includes a defect or not.

6. The at least one medium of claim 1, the instructions when executed by a machine to cause the machine to:
access a design file to construct feature vectors based at least in part on attributes of patterns corresponding to layout features of a semiconductor chip design corresponding to the data instances of the one or more dominant clusters; and
apply at least one clustering model to the feature vectors to determine region clusters.

7. The at least one medium of claim 6, the instructions when executed by a machine to cause the machine to assign the second threshold value to data instances corresponding to the determined region clusters.

8. The at least one medium of claim 7, the instructions when executed by a machine to cause the machine to assign the first threshold value to all remaining data instances of the plurality of data instances that do not correspond to the determined region clusters.

9. The at least one medium of claim 1, wherein applying at least one clustering model to the first subset of the plurality of data instances to identify one or more dominant clusters of data instances comprises clustering the first subset of the plurality of data instances based on one or more image analysis metrics.

10. The at least one medium of claim 1, wherein the plurality of data instances comprise a plurality of text collections and wherein a binary classification value determined for a data instance indicates whether the data instance is non-fiction or fiction.

11. A method comprising:
determining a binary classification value for each of a plurality of data instances based on a first threshold value assigned to each of the plurality of data instances;
applying at least one clustering model to a first subset of the plurality of data instances to identify one or more dominant clusters of data instances;
determining a second threshold value to assign to a second plurality of data instances that are included within the one or more dominant clusters of data instances; and
redetermining the binary classification value for each of the plurality of data instances, wherein the redetermination comprises determining, based on the second threshold value assigned to the second plurality of data instances, the binary classification value for each of the second plurality of data instances and determining, based on the first threshold value, the binary classification value for each of at least a portion of data instances of the plurality of data instances that are not included in the second plurality of data instances.

12. The method of claim 11, further comprising:
accessing a design file to construct feature vectors for the data instances of the one or more dominant clusters; and
applying at least one clustering model to the feature vectors to determine region clusters.

13. The method of claim 12, further comprising assigning the second threshold value to data instances corresponding to the determined region clusters.

14. The method of claim 13, further comprising assigning the first threshold value to all remaining data instances of the plurality of data instances that do not correspond to the determined region clusters.

15. The method of claim 11, wherein applying at least one clustering model to the first subset of the plurality of data instances to identify one or more dominant clusters of data instances comprises clustering the first subset of the plurality of data instances based on one or more image analysis metrics.

16. A system comprising:
a memory to store a plurality of data instances; and
a processor coupled to the memory, the processor to:
determine a binary classification value for each of the plurality of data instances based on a first threshold value assigned to each of the plurality of data instances;
apply at least one clustering model to a first subset of the plurality of data instances to identify one or more dominant clusters of data instances;
determine a second threshold value to assign to a second plurality of data instances that are included within the one or more dominant clusters of data instances; and
redetermine the binary classification value for each of the plurality of data instances, wherein the redetermination comprises determining, based on the second threshold value assigned to the second plurality of data instances, the binary classification value for each of the second plurality of data instances and determining, based on the first threshold value, the binary classification value for each of at least a portion of data instances of the plurality of data instances that are not included in the second plurality of data instances.

17. The system of claim 16, the processor to:
accessing a design file to construct feature vectors for the data instances of the one or more dominant clusters; and
applying at least one clustering model to the feature vectors to determine region clusters.

18. The system of claim 17, the processor to assign the second threshold value to data instances corresponding to the determined region clusters.

19. The system of claim 16, wherein applying at least one clustering model to the first subset of the plurality of data instances to identify one or more dominant clusters of data instances comprises clustering the first subset of the plurality of data instances based on one or more image analysis metrics.

20. The system of claim 16, further comprising an optical microscope to capture the plurality of data instances.

* * * * *